US009454702B2

(12) United States Patent
Sen et al.

(10) Patent No.: US 9,454,702 B2
(45) Date of Patent: Sep. 27, 2016

(54) REFLECTION BASED TRACKING SYSTEM (71) Applicant: Cisco Technology, Inc., San Jose, CA (US)

(72) Inventors: Mainak Sen, Palo Alto, CA (US); Debojyoti Dutta, Santa Clara, CA (US); Shaun Kirby, Pasadena, CA (US)

(73) Assignee: Cisco Technology, Inc., San Jose, CA (US)

( * ) Notice: Subject to any disclaimer, the term of this patent is extended or adjusted under 35 U.S.C. 154(b) by 556 days.

(21) Appl. No.: 13/968,235

(22) Filed: Aug. 15, 2013

(65) Prior Publication Data
US 2015/0049904 A1     Feb. 19, 2015

(51) Int. Cl.
| G06K 9/00 | (2006.01) |
| G02B 5/10 | (2006.01) |
| G06Q 10/08 | (2012.01) |
| G06K 9/20 | (2006.01) |
| G08B 13/196 | (2006.01) |

(52) U.S. Cl.
CPC ............. *G06K 9/00771* (2013.01); *G02B 5/10* (2013.01); *G06K 9/209* (2013.01); *G06Q 10/087* (2013.01); *G08B 13/19626* (2013.01)

(58) Field of Classification Search
CPC .... G06K 9/00771; G06K 9/209; G02B 5/10; G06Q 10/087
See application file for complete search history.

(56) References Cited

U.S. PATENT DOCUMENTS

| 5,530,652 A * | 6/1996 | Croyle ..................... A41H 1/02 356/394 |
| 6,304,285 B1 * | 10/2001 | Geng ............................. 348/36 |
| 7,685,023 B1 * | 3/2010 | Abraham ........... G06Q 30/0603 705/27.2 |
| 2005/0248729 A1 * | 11/2005 | Drucker et al. ................ 353/71 |
| 2006/0032915 A1 * | 2/2006 | Schwartz ...................... 235/383 |
| 2013/0002828 A1 * | 1/2013 | Ding .................. G02B 17/0836 348/49 |

FOREIGN PATENT DOCUMENTS

| DE | 198 12 899 | 7/1999 |
| JP | 2009 203060 | 9/2009 |
| JP | 2013 031108 | 2/2013 |

OTHER PUBLICATIONS

"The Home Depot Merchandising Core Standards," Course 4, Mosaic Learning, pp. 1-58, Oct. 17, 2011.*
"Frozen & Dairy Buyer," Got in-store execution?, www.fdbuyer.com; pp. 28-38, May 2010.*
International Search Report and Written Opinion from corresponding International application No. PCT/US2014/050275, dated Nov. 14, 2014.

* cited by examiner

*Primary Examiner* — Shefali Goradia (57) ABSTRACT

In one embodiment, a processor can receive data representing a view reflected by a mirror of a plurality of mirrors. The plurality of mirrors may be configured in a space to reflect a plurality of views of structures in the space. The mirror of the plurality of mirrors may include a uniquely identifiable feature distinguishable from other objects in the space. The processor can identify the mirror of the plurality of mirrors according to the uniquely identifiable feature. The processor can also determine an attribute of the structures according to the identified mirror and the data representing the view reflected by the mirror.

20 Claims, 7 Drawing Sheets

REFLECTION BASED TRACKING SYSTEM

TECHNICAL FIELD

The present disclosure relates to video camera systems and arrangements.

BACKGROUND

On-shelf availability and planogram compliance is an interest for retailers, manufactures, and suppliers. Knowing when to replenish shelves, for example, can be beneficial to sales of shelved products. Nonetheless, accurately and cost-effectively tracking on-shelf availability or planogram compliance remains problematic. Finding a solution to determine on-shelf availability or planogram compliance that strikes a balance between accuracy and cost effectiveness may be valuable.

DESCRIPTION OF EXAMPLE EMBODIMENTS

Overview

In one embodiment, a processor can receive data representing a view reflected by a mirror of a plurality of mirrors. The plurality of mirrors may be configured in a space to reflect a plurality of views of structures in the space. The mirror of the plurality of mirrors may include a uniquely identifiable feature distinguishable from other objects in the space. The processor can identify the mirror of the plurality of mirrors according to the uniquely identifiable feature. The processor can also determine an attribute of the structures according to the identified mirror and the data representing the view reflected by the mirror.

In another embodiment, a system may include a plurality of mirrors configured in a space so that the plurality of mirrors reflects a plurality of views of structures in the space. A mirror from among the plurality of mirrors may include a uniquely identifiable feature distinguishable from other objects in the space. The system may also include a camera configured to sense the plurality of reflected views and identify the mirror from among the plurality of mirrors according to the uniquely identifiable feature.

In another embodiment, a system may include a non-transitory computer readable medium including instructions executable to receive respective data representing a first view, a second view, and a third view reflected by a first mirror, a second mirror, and a third mirror of a plurality of mirrors, respectively. The plurality of mirrors may be configured in a space to reflect a plurality of views of structures in the space. The medium may also include instructions executable to identify the first mirror, the second mirror, and the third mirror. The first mirror may include a reflective surface that is convex with focal dimensions configured to provide a view of a first opposing structure surface to a camera. The second mirror may include a reflective surface that is convex with focal dimensions configured to provide a view of a second opposing structure surface to a third mirror. The third mirror may include a reflective surface that is concave with focal dimensions configured to provide a view of the second opposing structure surface to the camera. The medium may also include instructions executable to determine respective attributes of the first and the second opposing structure surfaces according to the identified first mirror, the identified second mirror, and the identified third mirror and the respective data representing the first view, the second view, and the third view.

Example Embodiments

Various embodiments described herein can be used alone or in combination with one another. The following detailed description describes only a few of the many possible implementations of the present embodiments. For this reason, this detailed description is intended by way of illustration, and not by way of limitation.

Analyzing or detecting on-shelf availability, planogram compliance, missing items, spills, and/or vandalism, for example, and knowing when to act accordingly, such as knowing when to replenish shelves or any other type of storage space or structure, can be beneficial to sales and storage of shelved items. Also, monitoring manufacturing process quality can help improve efficiency and product reliability. Further, monitoring public spaces, such as banks or hospitals, can reduce crime and provide for a sense of security. Nonetheless, determining solutions that strike balance between accuracy and cost effectiveness have proven to be difficult for retailers, manufacturers, suppliers, and other types of organizations. For example, radio-frequency identification (RFID), weight sensing, and other methods can be expensive and difficult to implement and maintain in an attempt to track on-shelf availability. Also, for example, placing cameras throughout a retail space, a bank branch, a hospital, or a warehouse so that all inventoried items (such as shelved items) or places of interest can be viewed can be costly. Also, in cases where cameras have already been installed for security, such cameras face areas that facilitate security surveillance and not necessarily the tracking of a space, such as retail, manufacturing, or warehouse space.

Described herein is a system, such as a reflection based tracking system, that can include a camera mounted near or attached to a structure, such as a ceiling, of a space populated with a plurality of mirrors. For example, the system can include a camera and a plurality of mirrors positioned throughout shelving of a space. Also, the system can sense and interpret on-shelf availability and/or planogram compliance. For example, the system can track arrangement of products via sensing and interpreting availability and positioning of products in real time across several aisles, using the camera and the mirrors. The camera can view contents of multiple rows of shelves by viewing the contents via the mirrors. A system without the mirrors may require at least a camera per row of shelves, for example; whereas, with the mirrors, one camera may be used for viewing the contents of multiple areas of a space, such as shelved areas. This camera and multiple mirror arrangement is especially useful with rows of shelves, since one row may occlude a view of another row of shelves.

In one example embodiment, a system can receive, at a processor, data representing a view reflected by a mirror from among a plurality of mirrors. The plurality of mirrors may be configured in a space to reflect a plurality of views of structures, such as shelving, in the space. The mirror from among the plurality of mirrors may include a uniquely identifiable feature that is distinguishable from other objects in the space. The uniquely identifiable feature may include a uniquely identifiable marking on the mirror and/or a shape of at least a part of the mirror. The processor of the system can identify the mirror from among the plurality of mirrors according to the uniquely identifiable feature. The processor can also determine an attribute of the structures according to the identified mirror and data representing the view reflected by the mirror. The system may also include a camera including or coupled with the processor that is configured to sense a plurality of reflected views from respective mirrors.

The viewed structures may be at least parts of furniture, fixtures, and/or machines, and a mirror of the plurality of mirrors may include a reflective surface that is convex with focal dimensions configured to provide a view of an opposing structure to a camera. In such an example, a first mirror of the plurality of mirrors may a reflective surface that is convex with focal dimensions configured to provide a view of an opposing structure to a second mirror, and the second mirror of the plurality of mirrors may include a reflective surface that is concave with focal dimensions configured to provide the view of the opposing structure to the camera. Also, a field of view of the first mirror may fit entirely into a field of view of the second mirror. Alternatively or additionally, a first mirror of the plurality of mirrors may include a reflective surface that is convex with focal dimensions configured to provide a view of an opposing structure to the camera, a second mirror of the plurality of mirrors may include a reflective surface that is convex with focal dimensions configured to provide a view of an opposing structure to a third mirror, and the third mirror of the plurality of mirrors may include a reflective surface that is concave with focal dimensions configured to provide a view of the opposing structure to the camera. In such an example, a field of view of the second mirror may fit entirely into a field of view of the third mirror. Also, distortion of a field of view provided by the first mirror may be reduced by a reflection of the field of view provided by the second mirror.

In one example of the system, the structures may be shelves, and the determined attribute may be on-shelf availability. Also, the structures may be at least parts of furniture, fixtures, machines, or a combination thereof, and the attribute may be an amount the structures match a determined planogram of the space.

In one example of the system, the determining the attribute may include identifying the reflective surface is convex and further determining the attribute of the structures according to the identification that the reflective surface is convex. In such a case, the plurality of mirrors may include a first mirror that may include a reflective surface that is convex with focal dimensions configured to provide a view of an opposing structure to a second mirror of the plurality of mirrors, the second mirror may include a reflective surface that is concave with focal dimensions configured to provide the view of the opposing structure to a camera, and the determining the attribute may include identifying a reflective surface of the second mirror is concave, and further determining the attribute of the structures according to the identification that the reflective surface of the second mirror is concave. Also, the determining the attribute may include accounting for a field of view of the first mirror fitting entirely into a field of view of the second mirror and/or distortion of a field of view of the first mirror being reduced by a reflection of the field of view provided by the second mirror.

In yet another example of the system, the system may include one or more non-transitory computer readable medium including instructions executable to receive respective data representing a first view, a second view, and a third view reflected by a first mirror, a second mirror, and a third mirror of a plurality of mirrors, respectively. In this example, the plurality of mirrors may be configured in a space to reflect a plurality of views of structures in the space. The medium may also include instructions executable to identify the first mirror, the second mirror, and the third mirror. The first mirror may include a reflective surface that is convex with focal dimensions configured to provide a view of an opposing structure surface to a camera. The second mirror may include a reflective surface that is convex with focal dimensions configured to provide a view of an opposing structure surface to the third mirror. The third mirror may include a reflective surface that is concave with focal dimensions configured to provide a view of the opposing structure surface to the camera.

The medium may also include instructions executable to determine respective attributes of the opposing structure surfaces according to the identified first mirror, the identified second mirror, and the identified third mirror and the respective data representing the first view, the second view, and the third view. The determination of the respective attributes may include accounting for a field of view of the second mirror fitting entirely into a field of view of the third mirror or distortion of a field of view of the second mirror being reduced by a reflection of the field of view provided by the third mirror.

Figure 1:
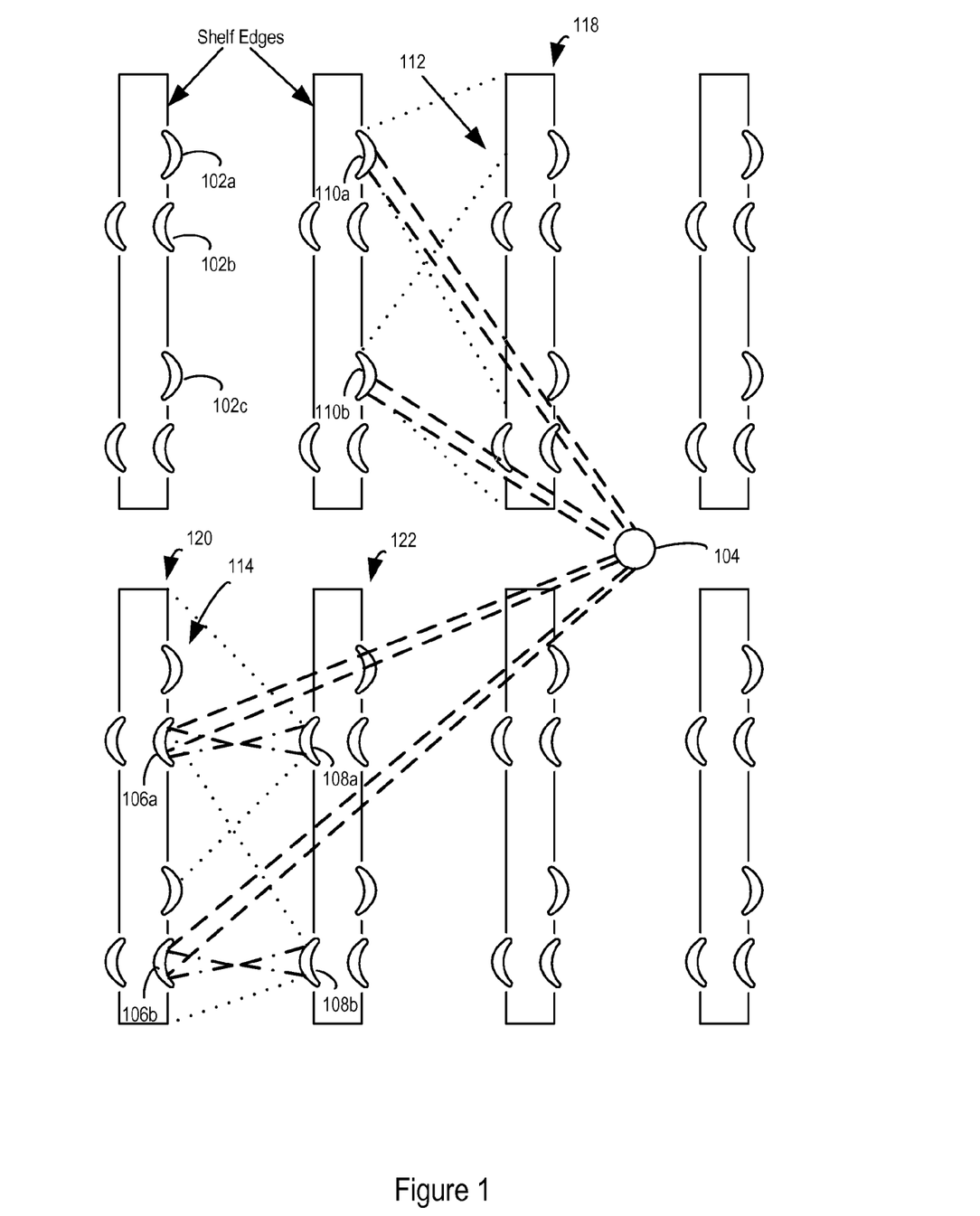
FIG. 1 illustrates a diagram of an example camera and example mirrors of an example embodiment of the system.

FIG. 1 illustrates an example camera and example mirrors of an example embodiment of the system. As depicted, mirrors (such as mirrors 102a, 102b, and 102c) can be mounted at shelf edges. A camera, such as pan-tilt-zoom (PTZ) camera 104, can be mounted on a wall, ceiling, or other type of structure within a space including shelves. The camera can be configured to pan, tilt, and zoom in on the mirrors to sense opposite shelf facings along lengths of aisles. The pan, tilt, and zoom can be programmed and/or operated manually. Also, the pan, tilt, and zoom can occur according to sensed objects in the environment, in real-time. Computer vision based hardware and/or software (such as color filters and shape filters) can analyze images sensed by the camera. The hardware and/or software can also remove image distortion and gauge metrics, such as metrics associated with on-shelf availability and planogram compliance. The camera can be communicatively coupled to a processor and/or the computer vision based hardware and/or software.

As illustrated, the mirrors can be strategically positioned to reduce or completely remove constraints on viewing angles of one or more mounted cameras. This can enable a camera or a minimal number of cameras to sense on-shelf availability, planogram compliance, and any other type of information related to storing items. In one example, such as illustrated in FIG. 1, geometry of the mirrors (such as the positioning, orientation, and/or shape of the mirrors) enables a single camera, such as a motorized camera, to view at least a majority of shelf facings in a region having several aisles of shelving.

Concave mirrors (such as mirrors 106a and 106b) and convex mirrors (such as mirrors 108a and 108b) may be used in such an example system. Convex mirrors (such as mirrors 110a and 110b) can reflect a direct view of a shelf face (such as shelf face 112) facing away from a camera (such as camera 104). Concave mirrors (such as mirrors 106a and 106b) can reflect the views of convex mirrors (such as mirrors 108a and 108b), which can provide a view of a face of a shelf not in a view of a camera (such as face 114 of a shelf 120) that may be partially occluded from the camera by another shelf or structure (such as shelf 122).

In FIG. 1, at shelf 118, the fields bordered by dashed lines represent single reflection views of shelf 118, where the camera 104 is positioned behind the shelf. The fields within the dotted lines represent light reflected off shelf 118, and then reflected off convex mirrors to camera 104. At shelf 120, the fields bordered by dashed lines represent double mirror reflected views of shelf 120. The fields within the dotted lines represent light reflected off shelf 120. The narrow triangular fields between the dotted-dashed lines represent reflections of the light reflected off the shelf 120 and then reflected from convex mirrors 108a and 108b to concave mirrors 106a and 106b, respectively. The concave mirrors 106a and 106b reflecting a double mirror reflection of light reflected off shelf 120 can enable the camera 104 to view all of shelf face 114, including occluded parts of the face.

In one example, the system may only use single mirror reflections. Where double mirror reflections are utilized, the system can use fewer cameras, and in some situations only use one camera for all shelves in a space. In using double reflections, where a focal length of a concave mirror is long enough, a zoom of a camera can be minimal to sense enough photons to perform meaningful video analytics. For example, a convex mirror may yield, via a reflection into an opposing concave mirror, an image including at least a majority of an aisle opposing the convex mirror. The focal lengths of the mirrors can be configured based on a distance of a mirror from a camera and/or other features of the environment. The entire reflection of the convex mirror may be included within the majority of the reflection of the concave mirror. Also, distortion of the view reflected by the convex mirror may be reduced by the reflection of the view provided by the concave mirror.

One or more surfaces of the convex and concave mirrors may be shaped with a uniquely identifiable contour so that a camera can find and identify particular convex and concave mirrors. Alternatively or additionally, convex and concave mirrors may each be identifiable via markings on the mirrors, such as notches on the mirrors or any other type of marking that would not be visually similar to an expected object in the environment. The mirrors may be defined specifically, and/or as to whether they are concave or convex in general, for example. Markings can be useful, since the positioning and orientation of the mirrors can shift, such as shifting via vibration in the environment. Also, positioning and relative orientation of a camera can shift, and by using markings, recalibration may not be necessary where there is unintentional movement of the camera or the mirrors.

In FIG. 1, the mirrors are a same shape, where a mirror facing out of a shelf may be arranged so that either a convex or a concave side of the mirror is facing out. In other examples, the mirrors may be different shapes. For example, a mirror may only have a convex reflective face or a concave reflective side. One advantage of having a mirror with both concave and convex reflective sides is that only one mirror needs to be produced for systems using double reflections. In such an example, the geometry of a mirror may be modified just by orientation and positioning, which provides a more elegant system.

Figure 2:
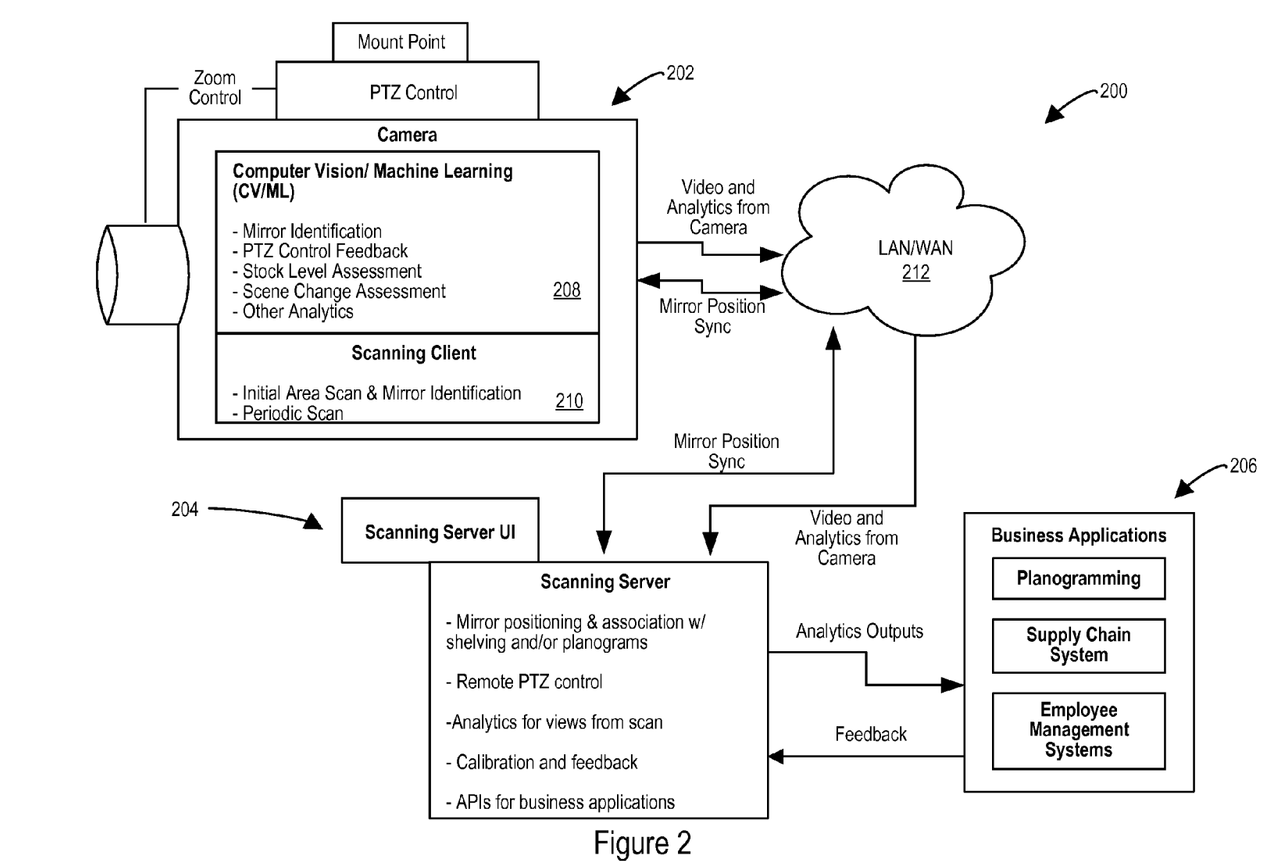
FIG. 2 illustrates a block diagram of an example adaptation of an example embodiment of the system.

FIG. 2 illustrates a block diagram of an example adaptation 200 of an example embodiment of the system. As illustrated, the adaptation 200 may include one or more cameras 202, a controller 204 with a user interface, such as at least one computer with a graphical user interface (GUI), and communicative coupling between the camera(s), the controller, and one or more modules 206 that may include applications, such as planogramming, supply chain, and employee management applications.

The camera(s) 202 may include a mount point, PTZ control, including zoom control, a computer vision/machine learning (CV/ML) module 208, and a scanning client module 210. The CV/ML module 208 may include a mirror recognition module, a locking and zoom guidance module, such as a PTZ control module, a stock level assessment module, a scene change assessment module, and other types of in-camera analytics modules. The scanning client module 210 may include an initial area scan and mirror identification module and a periodic scan module. Not depicted, these analytics and modules may be provided by a separate device communicatively coupled to the camera(s) 202.

The camera(s) 202 may be one or more still cameras and/or video cameras. Further, the camera(s) 202 may include, be replaced, or be combined with any type of sensor that can provide images or data associated with exposed faces of structures in a space, such as exposed shelving faces in a retail space. For example, the camera(s) may include one or more analog and/or digital based sensors, heat sensors, vibration sensors, electromechanical sensors, optical sensors, and/or other types of electromagnetic sensors.

The controller 204 may include a mirror control module for setting and managing mirror geometrics, such as mirror positioning, shape, and orientation. The management of mirror geometrics may be relative to planograms and/or shelving, for example. The controller 204 may also include a remote PTZ control module. The controller 204 may also include a module for selecting analytics for analyzing sensed views reflected from mirrors, and for scheduling scanning of the mirrors. The controller 204 may also include a feedback module and a machine learning module that can use data outputted by the feedback module. Such data may be used by the controller 204 to calibrate the cameras or some of the analytics. In one example embodiment, the controller 204 may be a server, such as a server dedicated to the scanning of the mirrors.

The camera(s) 202, the controller 204, and the module(s) 206 may be part of a variety of networks, such as a local area network (LAN)/wide area network (WAN) (e.g., LAN/WAN 212). The networks may be wireless and/or wired networks, and the camera(s) 202, the controller 204, and the module(s) 206 may be communicatively coupled via such networks (e.g., LAN/WAN 212). The networks may also include the Internet.

Although not depicted, in some examples, the variety of networks may include mass storage or any other form of area networks, such as a metropolitan area network (MAN) or a storage area network (SAN). Further, such networks (e.g., LAN/WAN 212) may also couple network components so that communications between the camera(s) 202, the controller 204, and the module(s) 206 can occur, whether communications are wire-line or wireless communications. Wire-line (such as a telephone line or coaxial cable) and wireless connections (such as a satellite link) can form channels that may include analog lines and digital lines. In communicating across such channels, the networks may utilize various architectures and protocols and may operate with a larger system of networks. Various architectures may include any variety or combination of distributed computing architectures, including, a 2-tier architecture (client-server architecture), an N-tier architecture, a peer-to-peer architecture, a tightly-coupled architecture, a service-oriented architecture (e.g., a cloud computing infrastructure), a mobile-code-based architecture, a replicated-repository-based architecture, and so forth. Signaling formats or protocols employed may include, for example, Transmission Control Protocol/Internet Protocol (TCP/IP), User Datagram Protocol (UDP), or the like.

With respect to a wireless networks, such networks may include stand-alone ad-hoc, mesh, Wireless LAN (WLAN), or a cellular network. Also, such networks may further include a system of terminals, gateways, switches, routers, call managers, and firewalls coupled by wireless radio links. A wireless network may further employ a plurality of network access technologies, including Global System for Mobile Communication (GSM), Universal Mobile Telecommunications System (UMTS), General Packet Radio Services (GPRS), Enhanced Data GSM Environment (EDGE), 3GPP Long Term Evolution (LTE), LTE Advanced, Wideband Code Division Multiple Access (WCDMA), Bluetooth, or 802.11b/g/n.

Networks (e.g., LAN/WAN 212) and the camera(s) 202, the controller 204, and the module(s) 206 may be or include one or more computational nodes of the system. For example, the aspects of the adaptation 200 can enable processing of different aspects of the system on one or more processors located at one or more of the computational nodes. A computational node may be one or more of any electronic device that can perform computations, such as a general-purpose computer, a mainframe computer, a workstation, a desktop computer, a laptop computer, a mobile device, and so forth. Computational nodes of the system may execute operations of the system, such as the operations illustrated in FIGS. 3-6.

Figure 3:
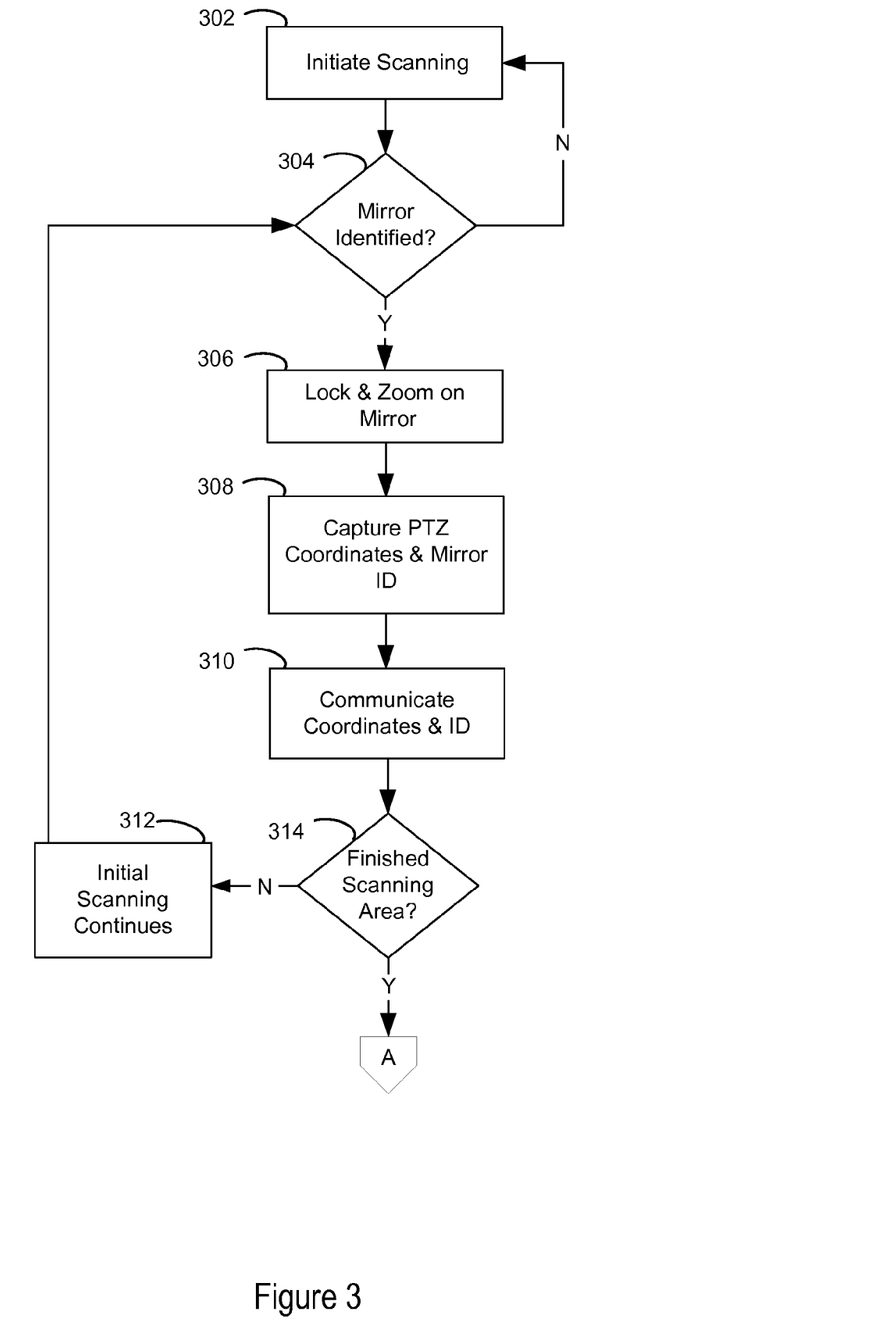
FIGS. 3-5 illustrate block diagrams of example operations of an example embodiment of the system.
Figure 4:
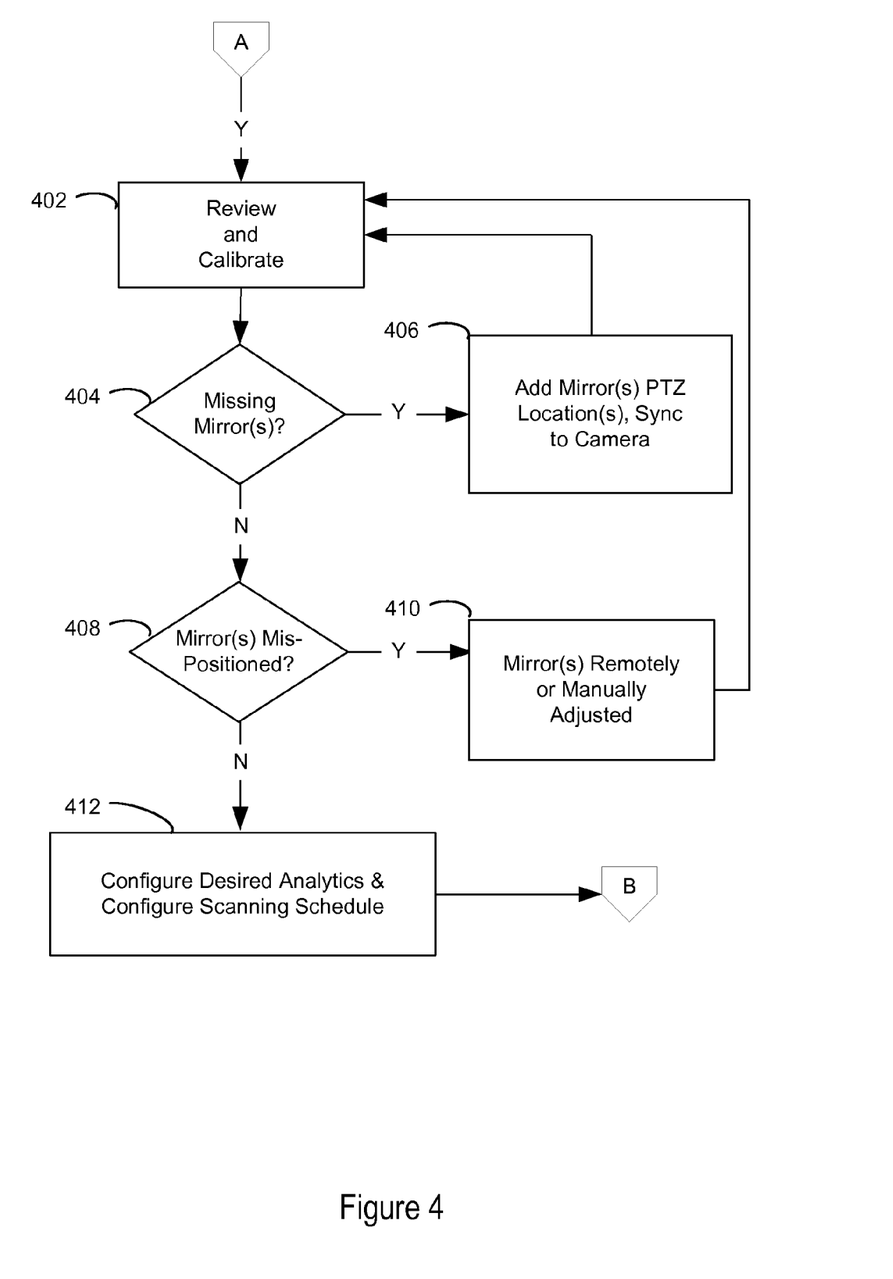
Figure 5:
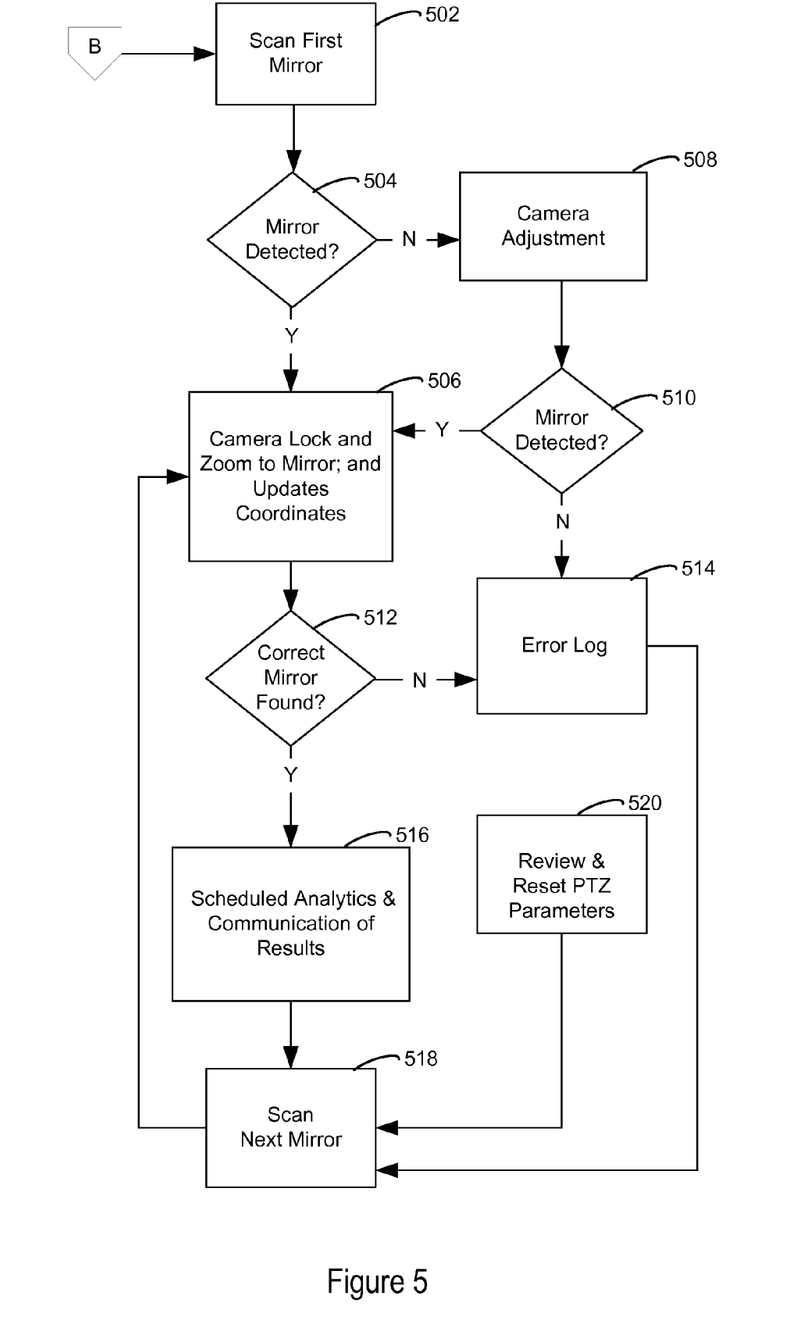

FIGS. 3-5 illustrate block diagrams of example operations of an example embodiment of the system. The operations of FIGS. 3-5 may be used to survey shelf facings and assess stock level, assess planogram compliance, or perform other types of analytics of a space, such as a manufacturing, storage, or retail space. After the installation of the mirrors and a camera, such as camera(s) 202, a scanning client, such as scanning client module 210, can initialize control and sensing aspects of the system.

As illustrated in FIG. 3, a scanning client module, such as module 210, can scan an area visible from where it is mounted to identify mirrors, which it can recognize by shape and/or markings on the mirrors (at 302). The identification of a mirror may occur via a sub-module of a scanning client module or a CV/ML module. Where a particular mirror is identified at 304, the camera(s) may pan, tilt, and/or zoom to fit a reflection from a mirror in a center of a field of view (at 306). The scanning client module may record PTZ parameters and a specific identification of the identified mirror, such as a serial number of the mirror (at 308). The scanning client module may communicate the recorded parameters and identification of the mirror to a scanning controller, such as controller 204 (at 310). The field of view may also be filled with the reflection from the mirror. The control of the pan, tilt, and/or zoom relative to alignment with the reflection may be controlled by computer vision analytics of a CV/ML module, such as the CV/ML module 208. A mirror serial number (such as one identified by the CV/ML Module) and PTZ coordinates may be stored in the scanning client module and synchronized to the scanning controller for use by analytics applications, such as the one or more modules 206 including applications, such as planogramming, supply chain, and employee management systems.

The system may continue to scan the shelved area for mirrors (at 312) until it is determined, for example, by the controller, the area is finished being scanned at 314.

As illustrated in FIG. 4, where the area is finished being scanned, an operator of the system can review the results of the scan and/or calibrate the scan according to the results (at 402). Such a review or calibration may occur via a GUI of a controller, such as controller 204. The review and calibration can also be done automatically via artificial intelligence. For example, the controller 204 can automatically align the camera with the mirrors using the identifications and/or by otherwise recognizing mirrors during the scan. Where one or more mirrors are missing from the results at 404, the operator from the user interface, for example may manually add a missing mirror's PTZ location and calibrate a camera, accordingly, at 406. Where the geometries of one or more mirrors are incorrect at 408, such geometries may be adjusted manually as well at 410. In one example, electromechanical parts may be attached to the mirrors so that a feedback loop in conjunction with the camera(s) can automatically adjust the mirrors when the positions and/or orientation of the mirrors are unintentionally altered.

At 412, the operator, by using a user interface of a controller, may lock the configurations for each mirror and configure a scanning schedule. Besides the initial setup and reconfigurations from the user interface of the controller, an operator can also specify which analytics are to be performed with the view of each mirror, such as selecting to perform stock level assessment and checking planogram compliance. Furthermore, the decisions and actions taken at 302-412 and associated with 302-412 may occur via automated processes, such as processes incorporating artificial intelligence and machine learning performed by a controller, such as controller 204.

Once the initiation and configuration of the system is finalized manually by an operator, and/or automatically, the system may proceed with continual or periodic scanning of the shelved area, manually and/or automatically. Such re-scanning may be useful since mirrors and the camera(s) may be bumped or moved through vibrations in the environment. For example, the camera(s) may locate a rim of a mirror through shape matching techniques to identify a unique shape of the mirror by panning and tilting slightly around the mirror location stored during the initialization scan until it locks onto the mirror. In such an example, the camera(s) may zoom in until the mirror occupies the full field of vision. However, such functionality may be disturbed by slight vibrations in the environment. Therefore, continual recalibration may be performed to resolve issues caused by slight vibrations.

As depicted in FIG. 5, the continual or periodic scanning may include beginning with a first mirror on the schedule at 502. Where that mirror is detected at 504, the camera may lock and zoom in on the mirror at 506. At this point, the controller may update the coordinates of the mirror where the coordinates have changed.

Where the mirror is not detected at 504, the camera(s) may pan, zoom, and tilt (at 508) until the first mirror is detected (at 506). At 510 and 512, where the mirror is not detected or it turns out that the wrong mirror was identified, respectively, the system generates an error log at 514. Where the correct mirror is identified at 512, a CV/ML module, such as the CV/ML module 208, may perform scheduled analytics and send results of the analytics to a controller, such as controller 204, at 516. At 518, the scanning client scans the area for the next mirror on the schedule. Prior to moving on to the next mirror, the operator, via a user interface of the controller, may review and reset PTZ parameters at 520. Similarly, the decisions and actions taken at 502-520 and associated with 502-520 may occur via automated processes, such as processes incorporating artificial intelligence and machine learning.

In identifying and running analytics on each image reflected by the mirrors, one aspect of the analysis includes determining whether the reflection is a double reflection or a single reflection. The analysis for a double reflection may be different from the analysis for a single reflection. In one example, for a double reflection view, the use of both a concave and convex mirror is considered; whereas, for a single reflection view, use of only a convex mirror is considered. Also, a CV/ML module may include separate double reflection filters and single reflection filters for image processing.

Not depicted in FIGS. 3-5, once the camera(s) have a valid and/or focused view of a reflection in a mirror, a corresponding image can be sensed for analysis. In one example, the image may be a high pixel density image. Alternatively or additionally, a CV/ML module may provide distortion removal through using image processing techniques, such as curvilinear perspective transformations. In one example, such distortion may be initially minimalized by geometries of different shape mirrors reflecting in combination. In such an example, further analysis or image processing may not be necessary to achieve business goals, such as appropriate levels of analytics. For example, because of the arrangement of the mirrors in some examples, further signal processing may not be necessary to track on-shelf availability and/or planogram compliance.

Further, the simplicity of the system is beneficial to many industries because strategically placing convex and concave mirrors, for example, can enable a single camera (or a couple of cameras) to zoom into occluded shelves for monitoring shelf specific activities throughout an area, such as a large retail space. A mirror can have a simple yet unique shape or another type of identifier, such as specific notch, for identification by a camera. The simplicity of this system limits the expense of a complicated and resource intensive network of cameras and image processors. In one example, the purpose is to provide a cost effective manner of viewing shelving in a retail space without the need for a great number of cameras. Furthermore, the sophistication of the camera(s) may be reduced, since image adjustments may be made by an arrangement of the mirrors. The mirrors themselves can be low costing mirrors, as long as they have sufficient geometric properties to reflect light from occluded areas of a space.

Besides the benefits to retail spaces, the system may also be used for tracking and monitoring equipment and production in a plant or warehouse, for example. The system can also be used for monitoring other aspects a supply chain process. The system may also be used for security surveillance. The system, through the mirrors, can identify objects that exist that are not expected, for example. Fine details of a space may require a multitude of cameras, but such is not the intent of preferred examples of this system.

Figure 6:
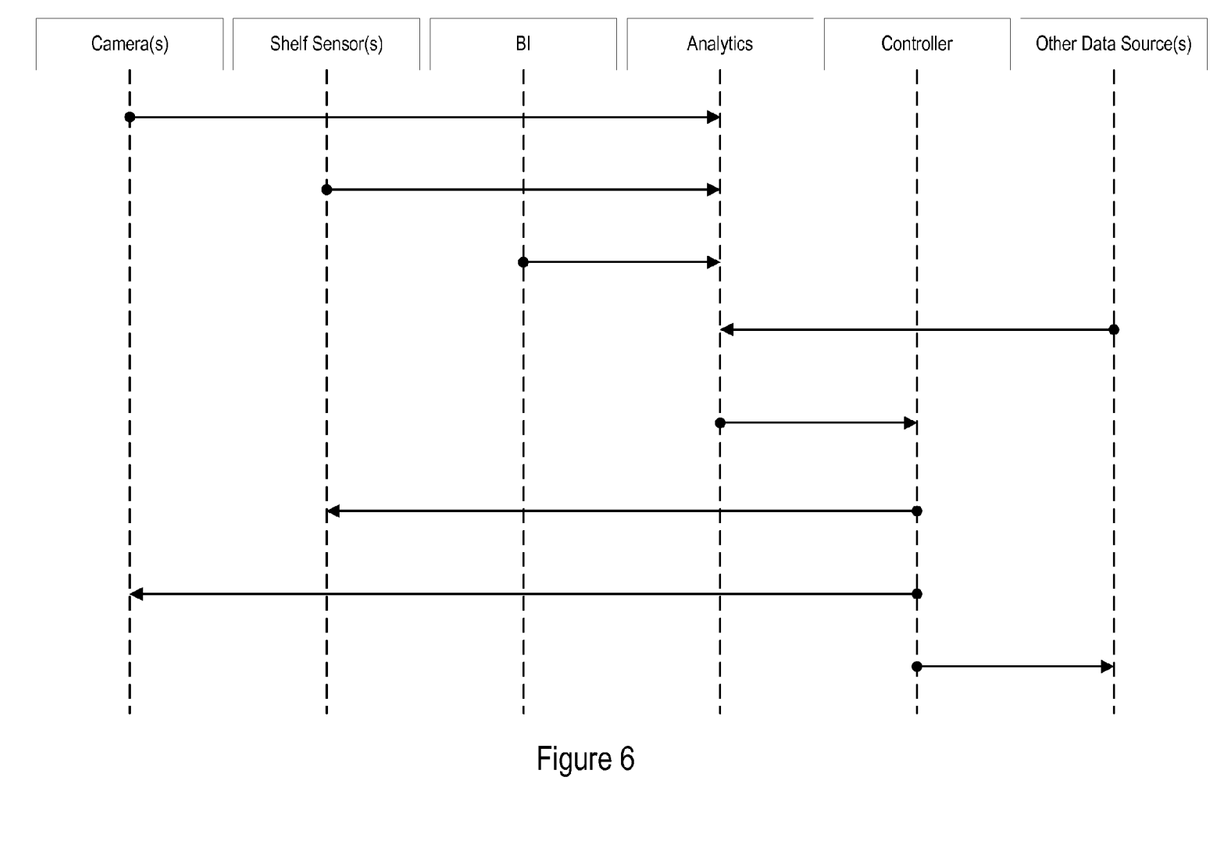
FIG. 6 illustrates a sequence diagram of example operations of an example embodiment of the system.

FIG. 6 illustrates an example sequence diagram of example operations of an example embodiment of the system. As illustrated, analytics modules (such as modules 208, 210, and modules of the controller 204) may receive information from one or more cameras, such as the camera(s) 202, other types of sensors, such as shelf sensors, other business intelligence systems (BI), and one or more other data sources, such as data sources external to the system including social network data sources and/or business enterprise data sources. Once the analytics modules receive the information from such sources, the information may be processed and then used by a controller, such as controller 204. In one example, the controller may control electro-mechanical devices attached to the mirrors, camera(s), and other types of sensors according to the information received and processed by the analytics modules. Also, feedback may be provided to the other data source(s). Besides the camera(s) discussed with respect to FIGS. 1-5, the camera(s) may also include cameras attached or associated with shelves and robotic cameras. The other types of sensors may include sensors that can read RFID signals or other physical characteristics of shelves, shelved items, or the mirror(s). The other sources of data may include social networking servers, industrial and manufacturing systems, news and weather information systems, and/or any other relevant sources of data.

Figure 7:
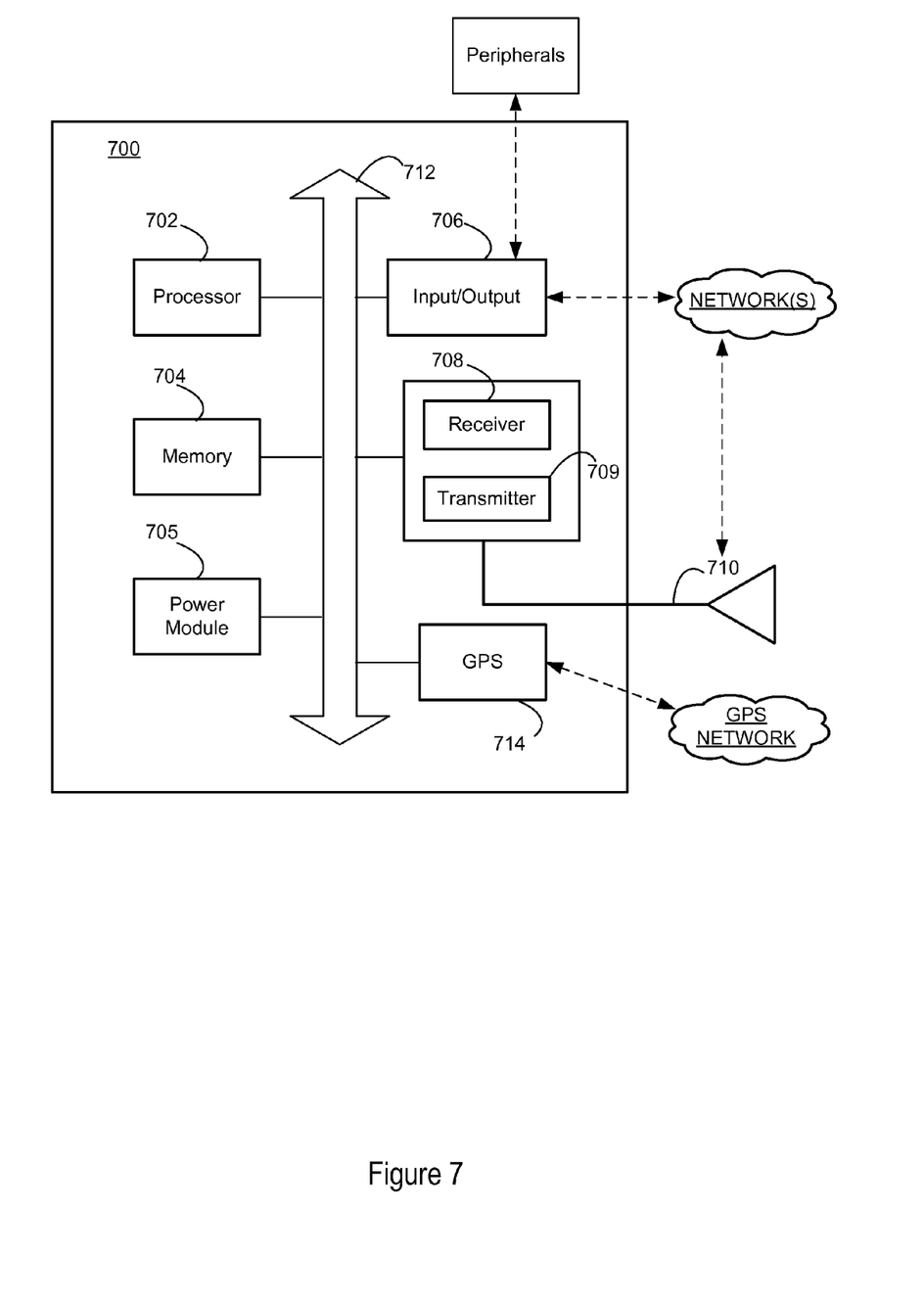
FIG. 7 illustrates a block diagram of an example computational node of example embodiment of the system.

FIG. 7 illustrates a block diagram of an example computational node 700 that can implement an aspect of an example embodiment of the system. Instances of the computational node 700 may be any device or server of the adaptation 200 (such as the camera(s) 202, the controller 204, the module(s) 206, and the devices of LAN/WAN 212) or any device capable of becoming a computational node of the system. The computational node 700, which can be a combination of multiple electronic devices, may include a processor 702, memory 704, a power module 705, input/output (I/O) 706 (including input/out signals, one or more display devices, one or more sensors, such as optical sensors of one or more cameras, and internal, peripheral, user, and network interfaces), a receiver 708 and a transmitter 709 (or a transceiver), an antenna 710 for wireless communications, a global positioning system (GPS) component 714, and/or a communication bus 712 that connects the aforementioned elements of the computational node 700. The processor 702 can be one or more of any type of processing device, such as a central processing unit (CPU). Also, for example, the processor 702 can be central processing logic; central processing logic may include hardware and firmware, software, and/or combinations of each to perform function(s) or action(s), and/or to cause a function or action from another component. Also, based on a desired application or need, central processing logic may include a software controlled microprocessor, discrete logic such as an application specific integrated circuit (ASIC), a programmable/programmed logic device, memory device containing instructions, or the like, or combinational logic embodied in hardware. The memory 704, such as RAM or ROM, can be enabled by one or more of any type of memory device, such as a primary (directly accessible by the CPU) or a secondary (indirectly accessible by the CPU) storage device (e.g., flash memory, magnetic disk, optical disk). The power module 705 contains one or more power components, and facilitates supply and management of power to the computational node 700. The input/output 706, can include any interface for facilitating communication between any components of the computational node 700, components of external devices (such as components of other devices of the adaptation 200), and users. For example, such interfaces can include a network card that is an integration of the receiver 708, the transmitter 709, and one or more I/O interfaces. The network card, for example, can facilitate wired or wireless communication with other nodes of the adaptation 200. In cases of wireless communication, the antenna 710 can facilitate such communication. Also, the I/O interfaces can include user interfaces, such as monitors, displays, keyboards, keypads, touchscreens, microphones, and speakers. Further, some of the I/O interfaces and the bus 712 can facilitate communication between components of the computational node 700, and in some embodiments ease processing performed by the processor 702. In other examples of the computational node 700, one or more of the described components may be omitted.

Various embodiments described herein can be used alone or in combination with one another. The foregoing detailed description has described only a few of the many possible implementations of the present embodiments. For this reason, this detailed description is intended by way of illustration, and not by way of limitation.

Furthermore, the separating of example embodiments in operation blocks or modules described herein or illustrated in the drawings is not to be construed as limiting these blocks or modules as physically separate devices. Operational blocks or modules illustrated or described may be implemented as separate or combined devices, circuits, chips, or computer readable instructions.

Each module described herein is hardware, or a combination of hardware and software. For example, each module may include and/or initiate execution of an application specific integrated circuit (ASIC), a Field Programmable Gate Array (FPGA), a circuit, a digital logic circuit, an analog circuit, a combination of discrete circuits, gates, or any other type of hardware, or combination thereof. Accordingly, as used herein, execution of a module by a processor can also refer to logic based processing by the module that is initiated directly or indirectly by a processor to complete a process or obtain a result. Alternatively or in addition, each module can include memory hardware, such as at least a portion of a memory, for example, that includes instructions executable with a processor to implement one or more of the features of the module. When any one of the modules includes instructions stored in memory and executable with the processor, the module may or may not include the processor. In some examples, each module may include only memory storing instructions executable with a processor to implement the features of the corresponding module without the module including any other hardware. Because each module includes at least some hardware, even when the included hardware includes software, each module may be interchangeably referred to as a hardware module.

Each module may include instructions stored in a non-transitory computer readable medium, such as memory 704 of FIG. 7, that may be executable by one or more processors, such as processor 702 of FIG. 7. Hardware modules may include various devices, components, circuits, gates, circuit boards, and the like that are executable, directed, or controlled for performance by the processor 702. Further, modules described herein may transmit or received data via communications interfaces via a network, such as or including the Internet. Also, the term "module" may include a plurality of executable modules.

What is claimed is:

1. A system, comprising:
a non-transitory computer readable medium including:
instructions executable to cause a camera to scan, via at least one of panning, zooming, and tilting, a space to locate two or more of a plurality of mirrors included in the space, each of the two or more located mirrors being configured to reflect a view of an occluded portion of structures in the space to the camera;
instructions executable to identify each of the two or more located mirrors according to a uniquely identifiable feature;
instructions executable to receive data representing views reflected by each identified mirror, wherein the plurality of mirrors are configured in the space to reflect a plurality of views of structures in the space; and
instructions executable to determine an attribute of the structures based on an identification of one of the identified mirrors and the data representing the view reflected by the one of the identified mirrors.

2. The system of claim 1, wherein the uniquely identifiable feature is a uniquely identifiable marking on the mirror.

3. The system of claim 1, wherein the uniquely identifiable feature is a shape of at least a part of the mirror.

4. The system of claim 1, wherein the structures are at least parts of furniture, fixtures, machines, or a combination thereof, each of the two or more located mirrors including a reflective surface that is convex with focal dimensions configured to provide a view of an occluded portion of the structures, and the attribute of the structures is planogram compliance.

5. The system of claim 1, wherein:
a first mirror of the plurality of mirrors includes a reflective surface that is convex with focal dimensions configured to provide a view of an occluded portion of one of the structures to a second mirror of the plurality of mirrors, and
the second mirror being one of the two or more located mirrors and including a reflective surface that is concave with focal dimensions configured to reflect the view to the camera.

6. The system of claim 5, wherein a field of view of the first mirror fits entirely into a field of view of the second mirror.

7. The system of claim 1, wherein:
a first mirror of the plurality of mirrors includes a reflective surface that is convex with focal dimensions configured to reflect a view of an occluded portion of a first structure of the structures to the camera;
a second mirror of the plurality of mirrors includes a reflective surface that is convex with focal dimensions configured to reflect a view of an occluded portion of a second structure of the structures to a third mirror of the plurality of mirrors; and
the third mirror includes a reflective surface that is concave with focal dimensions configured to provide the view of the occluded portion of the second structure to the camera, wherein the first mirror and the third mirror are two of the two or more located mirrors.

8. The system of claim 7, wherein a field of view of the second mirror fits entirely into a field of view of the third mirror.

9. The system of claim 7, wherein distortion of a field of view provided by the second mirror is reduced by a reflection of a field of view provided by the third mirror.

10. A method, comprising:
scanning, via at least one of panning, zooming, and tilting, a space with a camera to locate two or more of a plurality of mirrors included in the space, wherein scanning is controlled by a processor, each of the two or more located mirrors being configured to reflect a view of an occluded portion of structures in the space to the camera;
identifying, by the processor, each mirror of the two or more located mirrors according to a uniquely identifiable feature;
receiving, at a processor, data representing views reflected by each identified mirror, wherein the plurality of mirrors are configured in the space to reflect a plurality of views of structures in the space; and determining, by the processor, an attribute of the structures based on an identification of one of the identified mirrors and the data representing the view reflected by the one of the identified mirrors.

11. The method of claim 10, wherein the structures are shelves, and the attribute is on-shelf availability.

12. The method of claim 10, wherein the structures are at least parts of furniture, fixtures, machines, or a combination thereof, and the attribute is planogram compliance.

13. The method of claim 10, wherein the uniquely identifiable feature is a marking on the mirror.

14. The method of claim 10, wherein:
the structures are at least parts of furniture, fixtures, machines, or a combination thereof,
at least one of the two or more located mirrors includes a reflective surface that is convex with focal dimensions configured to provide a view of an occluded portion of one of the structures to the camera, and
determining the attribute includes:
identifying that the reflective surface of one of the located mirrors is convex; and
further determining the attribute of the structures according to the identification that the reflective surface is convex.

15. The method of claim 10, wherein:
the structures are at least parts of furniture, fixtures, machines, or a combination thereof,
the plurality of mirrors includes a first mirror that includes a reflective surface that is convex with focal dimensions configured to provide a view of an occluded portion of one of the structures to a second mirror of the plurality of mirrors,
the second mirror includes a reflective surface that is concave with focal dimensions configured to provide the view of the opposing structure to the camera,
the second mirror is one of the two or more located mirrors, and
the determining the attribute includes:
identifying that the reflective surface of the second mirror is concave; and
further determining the attribute of the structures according to the identification that the reflective surface of the second mirror is concave.

16. The method of claim 15, wherein the determining the attribute includes accounting for a field of view of the first mirror fitting entirely into a field of view of the second mirror.

17. The method of claim 15, wherein the determining the attribute includes accounting for distortion of a field of view of the first mirror being reduced by a reflection of a field of view provided by the second mirror.

18. A system, comprising:
a plurality of mirrors, the plurality of mirrors being configured to reflect a plurality of views of structures in a space;
a camera configured to scan the space, via at least one of panning, zooming, and tilting, to locate two or more of the plurality of mirrors, each of the two or more located mirrors being configured to reflect a view of an occluded portion of the structures to the camera;
a processor operably coupled to the camera and configured to:
identify each mirror of the two or more located mirrors according to a uniquely identifiable feature,
receive data representing the view reflected by each identified mirror of the two or more located mirrors,
determine an attribute of the structures based on an identification of the identified mirrors of the two or more located mirrors and the data representing the view reflected by the corresponding identified mirror.

19. The system of claim 18, wherein the two or more mirrors include:
a first mirror including a reflective surface that is convex with focal dimensions configured to provide a view of a first occluded portion of the structures to the camera;
a second mirror including a reflective surface that is concave with focal dimensions configured to provide a view of a second occluded portion of the structures to the camera; and
a third mirror including a reflective surface that is convex with focal dimensions configured to provide the view of the second occluded portion of the structures to the second mirror, wherein the first mirror and the second mirror are located mirrors and the processor is further configured to determine the attribute based on whether the reflective surface of one of the two or more located mirrors is concave or convex.

20. The system of claim 18, wherein the structures are at least parts of furniture, fixtures, machines, or a combination thereof, and the attribute is planogram compliance.

* * * * *